United States Patent
Wilding

(10) Patent No.: US 9,519,801 B2
(45) Date of Patent: Dec. 13, 2016

(54) SYSTEMS, METHODS, AND APPARATUSES FOR IMPLEMENTING DATA MASKING VIA COMPRESSION DICTIONARIES

(71) Applicant: Mark Wilding, Issaquah, WA (US)

(72) Inventor: Mark Wilding, Issaquah, WA (US)

(73) Assignee: salesforce.com, inc., San Francisco, CA (US)

( * ) Notice: Subject to any disclaimer, the term of this patent is extended or adjusted under 35 U.S.C. 154(b) by 372 days.

(21) Appl. No.: 14/135,424

(22) Filed: Dec. 19, 2013

(65) Prior Publication Data

US 2014/0172806 A1    Jun. 19, 2014

Related U.S. Application Data

(60) Provisional application No. 61/739,107, filed on Dec. 19, 2012.

(51) Int. Cl.
*G06F 17/30* (2006.01)
*G06F 21/62* (2013.01)

(52) U.S. Cl.
CPC ..... *G06F 21/6245* (2013.01); *G06F 17/30371* (2013.01); *G06F 17/30386* (2013.01)

(58) Field of Classification Search
CPC . H04N 19/132; H04N 19/42; G06F 17/30153; G06F 17/30386; G06F 21/6245; H03M 7/30
See application file for complete search history.

(56) References Cited

U.S. PATENT DOCUMENTS

| | | | |
|---|---|---|---|
| 5,373,290 A | * 12/1994 | Lempel | H03M 7/3088 341/106 |
| 5,455,576 A | * 10/1995 | Clark, II | G06T 9/005 341/50 |
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |

(Continued)

*Primary Examiner* — Tuan A Pham
*Assistant Examiner* — Merilyn Nguyen
(74) *Attorney, Agent, or Firm* — Blakely Sokoloff Taylor & Zafman LLP

(57) ABSTRACT

In accordance with disclosed embodiments, there are provided methods, systems, and apparatuses for implementing data masking via compression dictionaries including, for example, means for receiving customer data at the host organization; compressing the customer data using dictionary based compression and a compression dictionary; storing the compressed customer data in a database of the host organization; retrieving the compressed customer data from the database of the host organization; and de-compressing the compressed customer data via a masked compression dictionary, in which the masked compression dictionary de-compresses the customer data into masked customer data. Other related embodiments are disclosed.

21 Claims, 10 Drawing Sheets

(56) References Cited

U.S. PATENT DOCUMENTS

| | | |
|---|---|---|
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,879,266 B1 * | 4/2005 | Dye ................ G06F 12/08 341/51 |
| 7,340,411 B2 | 3/2008 | Cook |
| 7,620,655 B2 | 11/2009 | Larsson et al. |
| 2001/0044791 A1 | 11/2001 | Richter et al. |
| 2001/0054131 A1 * | 12/2001 | Alvarez, II ........ H04N 19/42 711/105 |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0022312 A1 * | 2/2004 | Jones ................ G06T 9/005 375/240 |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0050025 A1 * | 2/2008 | Bashyam ............ G06F 9/002 382/238 |
| 2008/0071748 A1 * | 3/2008 | Wroblewski ...... G06F 17/30448 |
| 2010/0223237 A1 * | 9/2010 | Mishra ............... G06F 9/30156 707/693 |

* cited by examiner

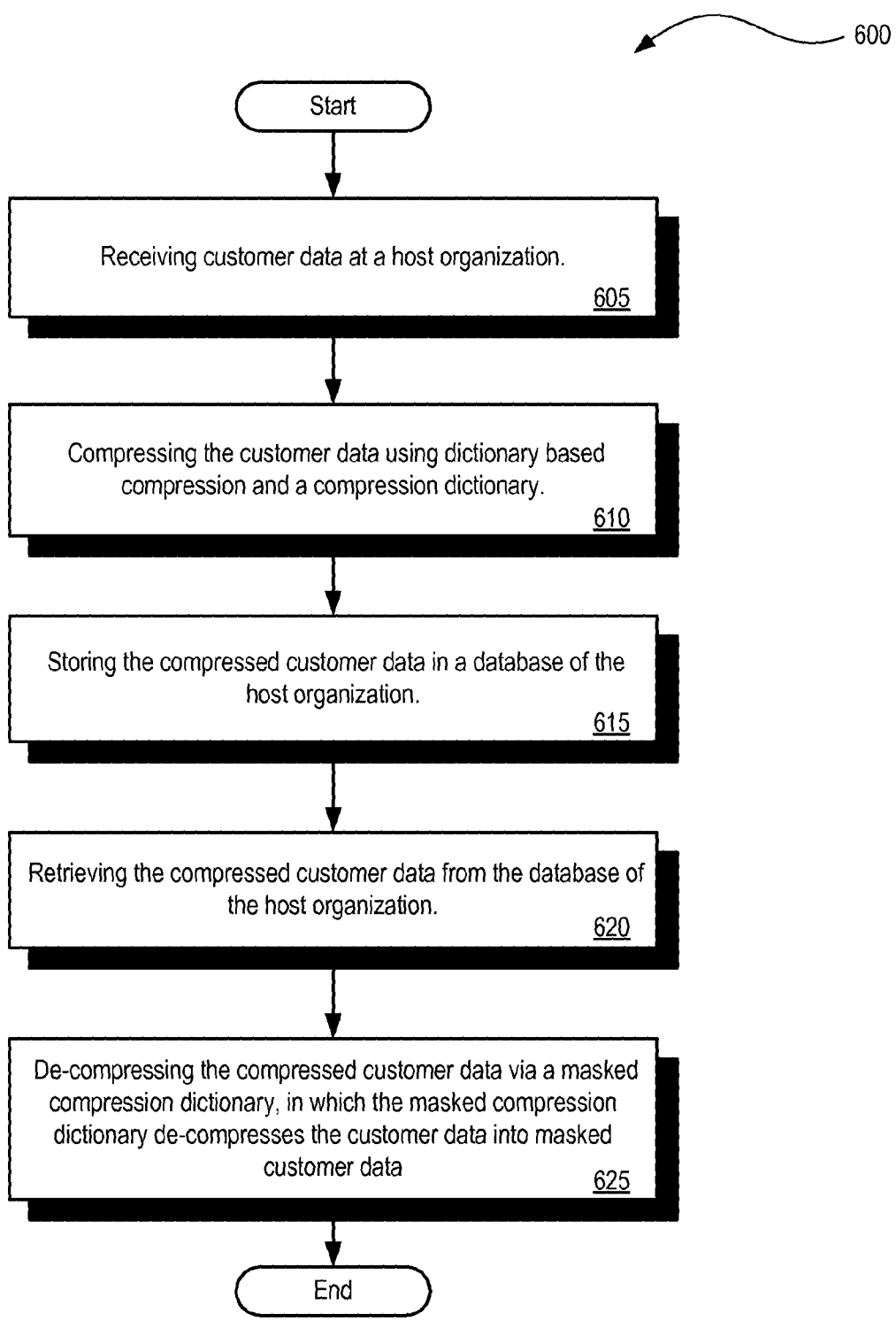

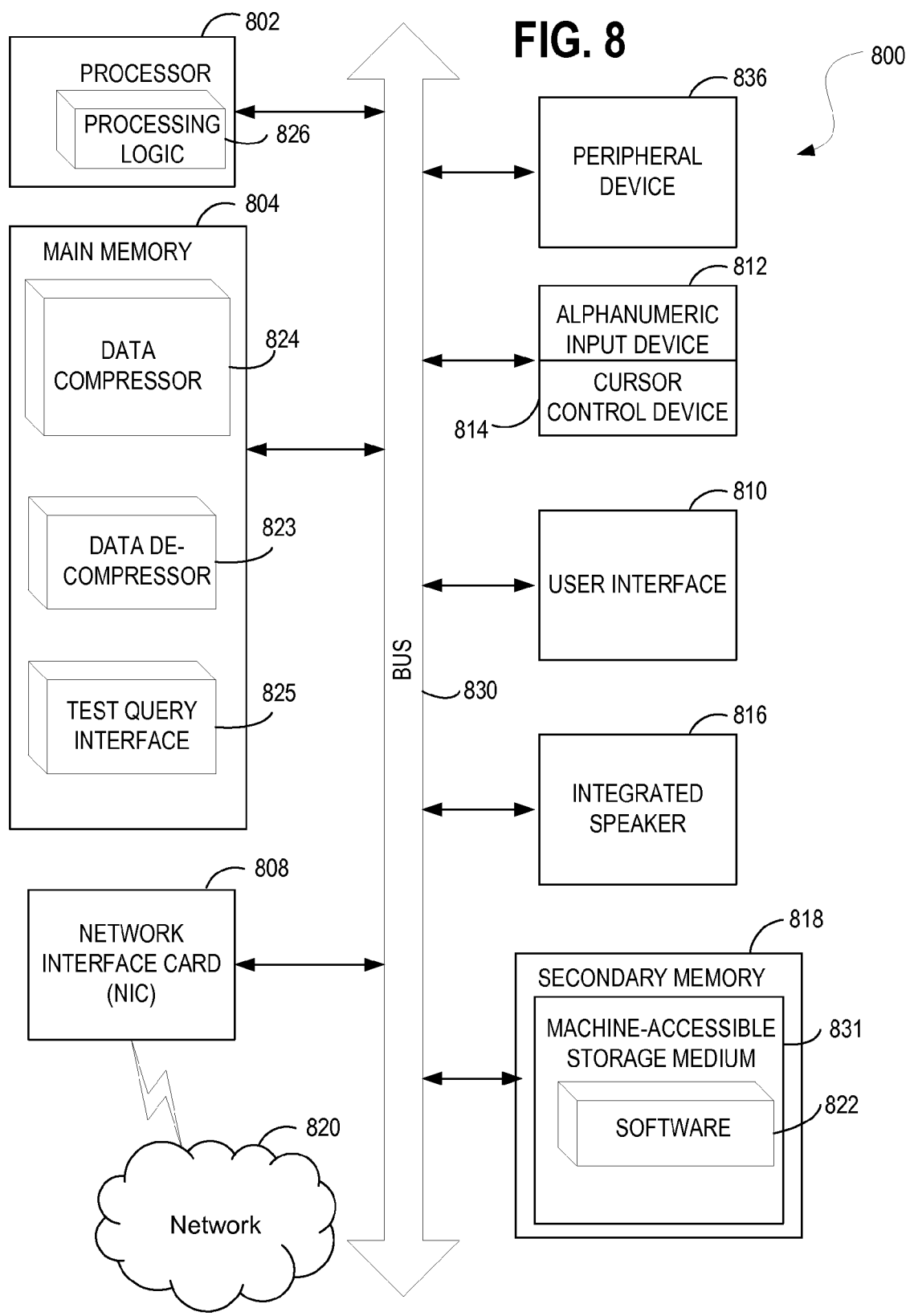

SYSTEMS, METHODS, AND APPARATUSES FOR IMPLEMENTING DATA MASKING VIA COMPRESSION DICTIONARIES

CLAIM OF PRIORITY

This application is related to, and claims priority to, the provisional utility application entitled "DATA MASKING VIA COMPRESSION DICTIONARIES," filed on Dec. 19, 2012, having an application No. 61/739,107, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments of the invention relate generally to the field of computing, and more particularly, to systems, methods, and apparatuses for implementing data masking via compression dictionaries.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to embodiments of the claimed inventions.

A single a multi-tenant database system operates to store data on behalf of a multitude of paying subscribers, each being a "tenant" of the database system, hence the term multi-tenant database system.

Within such an operational environment, computational efficiency, system responsiveness, and data security are all of paramount concern both to the provider of the multi-tenant database system and to the subscribers or tenants of such a system. Moreover, as cloud based technology has matured and become increasingly commonplace within the marketplace over the past several years there has been an increased sensitivity to data privacy concerns as well as regulation mandating certain protections and controls on data protection and privacy. For instance, cloud based technologies, if they are to remain competitive, must adhere to contractual requirements, marketplace concerns regarding, trade-secrets information, as well as state and Federal laws mandating certain privacy and data safeguards.

Notwithstanding these requirements, there is also a need to ensure comprehensive testing of the cloud based technologies which store data on behalf of subscribers. For instance, it is sometimes the case that software released into the production environment passes testing procedures based upon synthetic data used for testing purposes yet fails when applied to live customer data in the production environment, at which point the error is far more damaging and costly than had it been caught prior to production release.

To that end, it would be highly beneficial to utilize actual live production data belonging to such customers in the testing of the hardware, software, and other infrastructure modifications to the multi-tenant database system, but for the legal and privacy related reasons noted above, use of customers' data in such a way would be improper and would potentially represent a contractual breach as well as a compliance violation.

The present state of the art may therefore benefit from the systems, methods, and apparatuses for implementing data masking via compression dictionaries as described herein.

BRIEF DESCRIPTION OF THE DRAWINGS

Embodiments are illustrated by way of example, and not by way of limitation, and will be more fully understood with reference to the following detailed description when considered in connection with the figures in which:

FIG. 6 is a flow diagram illustrating a method for implementing data masking via compression dictionaries in accordance with disclosed embodiments;

FIG. 8 illustrates a diagrammatic representation of a machine in the exemplary form of a computer system, in accordance with one embodiment.

DETAILED DESCRIPTION

Figure 1:
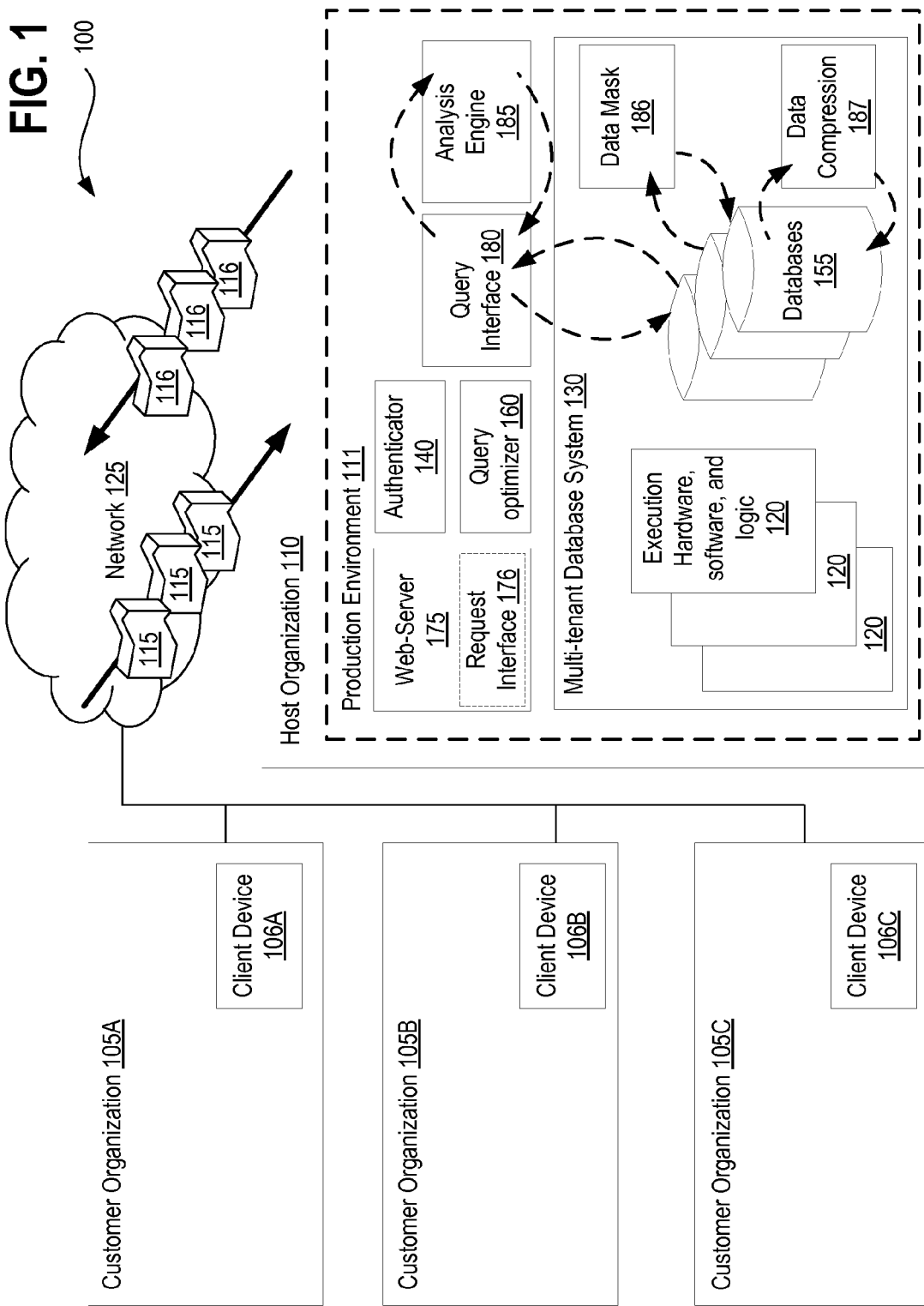
FIG. 1 depicts an exemplary architecture in accordance with described embodiments.

Described herein are systems, methods, and apparatuses for implementing data masking via compression dictionaries in an on-demand service environment. Such systems, devices, and methods may include, for example, means for: receiving customer data at the host organization; compressing the customer data using dictionary based compression and a compression dictionary; storing the compressed customer data in a database of the host organization; retrieving the compressed customer data from the database of the host organization; and de-compressing the compressed customer data via a masked compression dictionary, in which the masked compression dictionary de-compresses the customer data into masked customer data.

There may be many compression dictionaries used by the methodologies herein. For instance, one set of dictionaries may be used for production and another set of dictionaries used for masked data. For instance, data may be compressed at a granular level (e.g. a group of DB blocks) thus using a dictionary for the granular level or one compression dictionary may be utilized for the entire database. Additionally masking dictionaries may further be utilized to mask data that is not compressible. Test and support persons may, for instance, both utilize the same masked data interface which would result in data that is still sensitive, but less sensitive than unmasked data. Companies which produce the masked data may therefore implement special procedures for handling of such data due to the fact that it remains sensitive. For instance, the data may be accessible or shared on a strict as-needed basis or require other protections to ensure the privacy of customer's data is maintained.

The dictionary and masked dictionary referred to here may be a set of dictionaries utilized for the purposes of compression and de-compression or compression and de-compression plus data masking as appropriate and as is described in additional detail below. Further still, the dictionary and masked dictionary may constitute a set of dictionaries utilized for an entire database or a set of dictionaries utilized for a specific database or a sub-set of the multi-tenant database.

In the following description, numerous specific details are set forth such as examples of specific systems, languages, components, etc., in order to provide a thorough understanding of the various embodiments. It will be apparent, however, to one skilled in the art that these specific details need not be employed to practice the embodiments disclosed herein. In other instances, well known materials or methods have not been described in detail in order to avoid unnecessarily obscuring the disclosed embodiments.

In addition to various hardware components depicted in the figures and described herein, embodiments further include various operations which are described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software.

Embodiments also relate to an apparatus for performing the operations disclosed herein. This apparatus may be specially constructed for the required purposes, or it may be a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, embodiments are not described with reference to any particular programming language. It will be appreciated that a variety of programming languages may be used to implement the teachings of the embodiments as described herein.

Embodiments may be provided as a computer program product, or software, that may include a machine-readable medium having stored thereon instructions, which may be used to program a computer system (or other electronic devices) to perform a process according to the disclosed embodiments. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical), etc.

Any of the disclosed embodiments may be used alone or together with one another in any combination. Although various embodiments may have been partially motivated by deficiencies with conventional techniques and approaches, some of which are described or alluded to within the specification, the embodiments need not necessarily address or solve any of these deficiencies, but rather, may address only some of the deficiencies, address none of the deficiencies, or be directed toward different deficiencies and problems where are not directly discussed.

FIG. 1 depicts an exemplary architecture 100 in accordance with described embodiments. In one embodiment, a production environment 111 is communicably interfaced with a plurality of client devices 106A-C (e.g., such as mobile devices, smart phones, tablets, PCs, etc.) through host organization 110. In one embodiment, a multi-tenant database system 130 includes databases 155, for example, to store tables, datasets, and underlying database records with user data on behalf of customer organizations 105A-C or users.

Multi-tenant database system 130 includes a plurality of underlying hardware, software, and logic elements 120 that implement database functionality and a code execution environment within the host organization 110. In accordance with one embodiment, multi-tenant database system 130 further implements databases 155 to service database queries and other data interactions with the databases 155. The hardware, software, and logic elements 120 of the multi-tenant database system 130 are separate and distinct from a plurality of customer organizations (105A, 105B, and 105C) which utilize the services provided by the host organization 110 by communicably interfacing to the host organization 110 via a network 125. In such a way, host organization 110 may implement on-demand database services or cloud computing services to subscribing customer organizations 105A-C.

Host organization 110 receives input and other requests 115 from a plurality of customer organizations 105A-C via network 125 (such as a public Internet). For example, incoming database queries, API requests, interactions with displayed graphical user interfaces and displays at the client devices 106A-C, or other inputs may be received from the customer organizations 105A-C to be processed against the multi-tenant database system 130, including queries to read, write, and update data stored within the databases 155.

In one embodiment, each customer organization 105A-C is an entity selected from the group consisting of: a separate and distinct remote organization, an organizational group within the host organization 110, a business partner of the host organization 110, or a customer organization 105A-C that subscribes to cloud computing services provided by the host organization 110.

In one embodiment, requests 115 are received at, or submitted to, a web-server 175 within host organization 110. Host organization 110 may receive a variety of requests for processing by the host organization 110 and its multi-tenant database system 130. Incoming requests 115 received at web-server 175 may specify which services from the host organization 110 are to be provided, such as query requests, search request, status requests, database transactions, graphical user interface requests and interactions, processing requests to retrieve, update, or store data on behalf of one of the customer organizations 105A-C, code execution requests, and so forth. Web-server 175 may be responsible for receiving requests 115 from various customer organizations 105A-C via network 125 and provide a web-based interface or other graphical displays to an end-user client device 106A-C or machine originating such data requests 115.

Authenticator 140 operates on behalf of the host organization to verify, authenticate, and otherwise credential users attempting to gain access to the host organization.

Query interface 180 provides functionality to pass queries from web-server 175 into the multi-tenant database system 130 for execution against the databases 155 or other data stores of the host organization's production environment 111. In one embodiment, the query interface 180 implements an Application Programming Interface (API) through which queries may be executed against the databases 155 or other data stores. Query optimizer 160 performs query translation and optimization, for instance, on behalf of other functionality such as functionality of a graphical interface which possesses sufficient information to architect a query yet lacks the necessary logic to actually construct the appropriate query syntax. In other instances, query optimizer 160 modifies a submitted query to optimize its execution within the host organization without affecting the resulting dataset returned responsive to such an optimized query. Analysis engine 185 operates on behalf of functionality within the host organization to perform additional data evaluation where necessary.

Host organization 110 may implement a request interface 176 via web-server 175 or as a stand-alone interface to receive requests packets or other requests 115 from the client devices 106A-C. Request interface 176 further supports the return of response packets or other replies and responses 116 in an outgoing direction from host organization 110 to the client devices 106A-C.

Data mask 186 and data compression 187 units are further depicted as interacting with the databases 155. Data mask 186 unit performs data masking via compression dictionaries to obfuscate customer data when necessary, for instance, where customer data needs to be obfuscated prior to use in test sequences. Data compression 187 unit performs dictionary based data compression to optimize the storage footprint of data stored in the database 155, specifically, to reduce the storage requirements of customer data where possible. According to one embodiment, Data mask 186 unit operates by de-compressing previously compressed and stored customer data via a masked compression dictionary resulting in customer data that is uncompressed by masked and therefore obfuscated from its original form and meaning.

Figure 2:
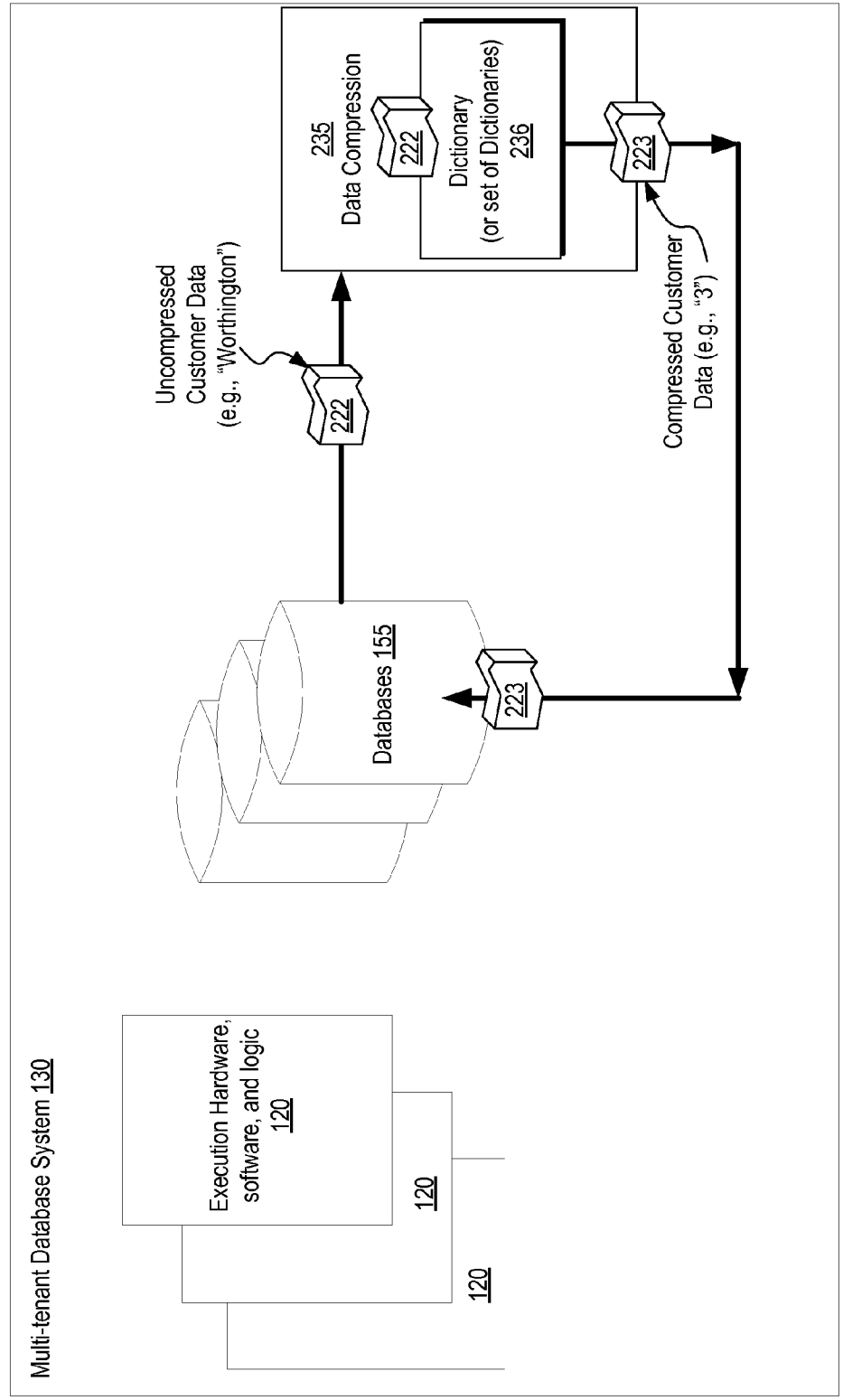
FIG. 2 depicts another exemplary architecture in accordance with described embodiments.

FIG. 2 depicts another exemplary architecture 200 in accordance with described embodiments. In particular, there is depicted the multi-tenant database system 130, its hardware, software, and logic elements 120 and supporting databases 155 which store customer data within a live production environment (e.g., such as production environment 111 as depicted at FIG. 1).

Additionally depicted is a data compression 235 unit having therein a dictionary 236. The data compression 235 unit implements dictionary based data compression. For instance, uncompressed customer data 222 (e.g., having the plain text string "Worthington") may be provided to the data compression 235 unit which then applies data compression on the uncompressed customer data 222 by correlating the data to a corresponding symbol indexed by the dictionary 236 resulting in compressed customer data 223 (e.g., having the symbol or string "3") which is then returned to the databases 155 for storage.

The dictionary based compression algorithms seek to reduce the amount of storage space on disk required to store the same amount of data by converting it into a smaller but recoverable form by exploiting the redundancy of data stored in the database. For instance, consider that in 2009 the top 1000 first names accounted for ~73% of all names in the United States at which time there were nearly 250 million individuals, thus representing significant redundancy and therefore a significant opportunity for compression. Dictionary-based algorithms do not encode single symbols as variable-length bit strings, but rather, they encode variable-length strings of symbols as single symbols. The symbols form an index into a phrase dictionary and the dictionary is then used as a simple lookup table to map between the symbols and the non-compressed original data in its plain-text form. Dictionary compression can be used for more than just strings. For instance, a dictionary or set of dictionaries may be used for a range of database blocks.

Numerous other examples, dictionaries, and variations of methodologies exist, with the underlying principle that a smaller string, symbol, offset, index, code, token, etc. to represent a larger string enables compression.

The dictionary based data compression as applied by data compression 235 unit does not itself implement security measures to protect the data, but rather, is simply a means by which uncompressed customer data 222 can be stored more efficiently within the databases 155.

Massive quantities of customer data are stored within the databases 155 of the multi-tenant database system 130 which translates into infrastructure costs for procurement, maintenance, power, cooling, physical space to house the databases 155, and so on. For these reasons, it is increasingly common for databases 155 to be compressed so as to reduce the amount of storage space required to store the same amount of data on behalf of customers. At the same time, as CPU processing speed continues advance, the delay and computational burden of compressing and de-compressing data becomes less problematic, thus making data compression more economically feasible to the host organization responsible for the multi-tenant database system 130.

Depending on the implementation and processing capacity of the multi-tenant database system 130 data may be immediately compressed upon insertion into the databases 155 or alternatively, uncompressed customer data 222 may be retrieved from the database, compressed, and then stored into the database as compressed customer data 223 either overwriting the original uncompressed data or subsequently marking the uncompressed customer data 222 for deletion from the databases 155.

Figure 3:
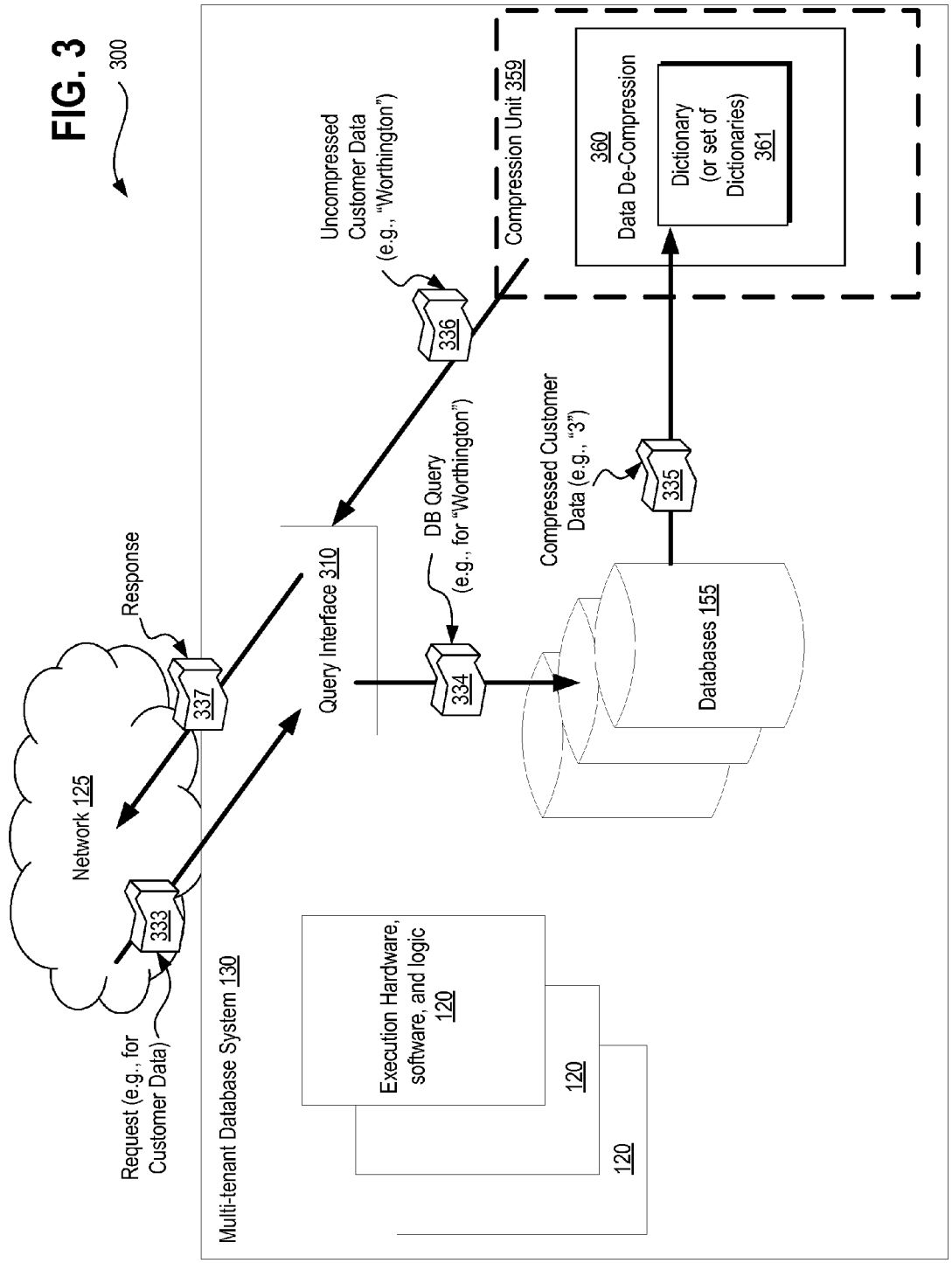
FIG. 3 depicts another exemplary architecture in accordance with described embodiments.

FIG. 3 depicts another exemplary architecture 300 in accordance with described embodiments. In particular, there is depicted the multi-tenant database system 130, its hardware, software, and logic elements 120 and supporting databases 155 which store compressed customer data 335 within a live production environment. Compression unit 359 performs compression and decompression as needed, for instance, compressing/de-compressing via a dictionary or set of dictionaries or compressing/de-compressing via a masked dictionary or set of masked dictionaries to render uncompressed data in a masked form.

Further depicted here is the receipt of a request for customer data 333 which arrives at the query interface 310. The query interface 310 then issues a database query 334 to the databases 155 resulting in the compressed customer data 335 (e.g., having a compression symbol value of "3") being returned as the value of the customer's stored data in its compressed form pursuant to prior data compression techniques. Before returning the data responsive to the request for customer data 333, the compressed customer data 335 is then passed through the data de-compression 360 unit and its dictionary 361 resulting in the uncompressed customer data 336 (e.g., the string "Worthington") being returned to the query interface 310 which then returns a response 337 having the uncompressed customer data 336 therein as part of the response or returned dataset responsive to the request 333. Stated differently, the string "Worthington" is recovered subsequent to compression and correctly returned responsive to the request for customer data 333.

Figure 4:
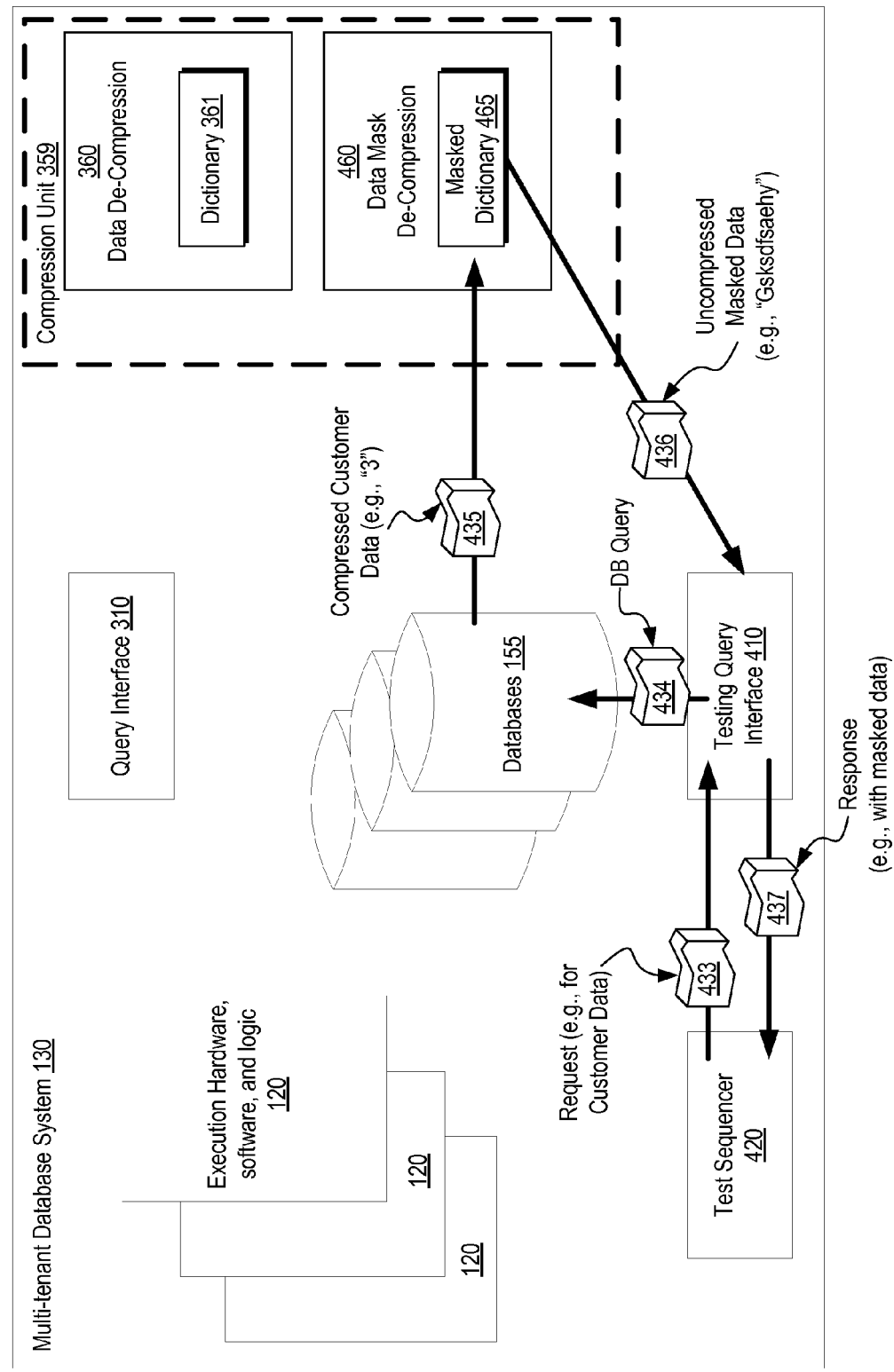
FIG. 4 depicts another exemplary architecture in accordance with described embodiments.

FIG. 4 depicts another exemplary architecture 400 in accordance with described embodiments. In particular, there is depicted the multi-tenant database system 130, its hardware, software, and logic elements 120, supporting databases 155 which store compressed customer data 435 within a live production environment, and compression unit 359 to perform compression and decompression as needed.

Additionally depicted here is a test sequencer 420 and a testing query interface 410 capable of submitting DB queries to the databases 155. In the example show here, the test sequencer 420 makes a request 433 for customer data for the purposes of testing, however, this request 433 is issued to a testing query interface 410, for instance, operating as an on the fly test query Application Programming Interface (API) which permits requests and queries to be handled in an identical fashion to the query interface 310 previously described, but for the purposes of supporting test transactions rather than production transactions.

The testing query interface 410 issues a database query 434 to the databases 155 of the multi-tenant database system 130 resulting in compressed customer data 435 (e.g., having the symbol "3" rather than an uncompressed string) being returned by the databases 155 responsive to the database query 434. However, unlike a production transaction and query which is processed via the data de-compression 360 unit and its dictionary 361, the testing query interface 410 instead causes the compressed customer data 435 to be processed through the data mask de-compression 460 unit and its masked dictionary 465 which in turn causes uncompressed masked data 436 to be returned. For instance, instead of the compressed symbol "3" being de-compressed to the string "Worthington" as would happen with dictionary 361, the compressed symbol "3" is instead uncompressed to the string "Gsksdfsaehy" according to the masked dictionary 465.

The uncompressed masked data 436 is returned to the testing query interface 410 which then returns the value to the test sequencer 420 responsive to the request 433. In such a way, an on-the-fly or ad-hoc query mechanism is established for the purposes of test transactions which does not require a separate copy of the customers data to be stored in a masked form. Rather, a single copy of customer data may be stored at the databases 155 and further reduced in terms of storage requirements by having been stored in compressed form, and then test queries needing to utilize data from the live production database can interact with the databases 155 in the usual manner but be exposed only to obfuscated data as a result of de-compression being processed through the masked dictionary 465 as shown. Additional dictionaries (e.g. in the set) may be required to mask any uncompressed data. Masked data, regardless of whether it is masked from compressed data or not remains sensitive, but lesser so than original data in its plaintext and uncompressed form.

Use of live production customer data can often find defects in software such as web based application or database operations whereas synthetic test data will not. Certain problems escape test and enter production because the test data utilized to exercise the various test sequences fails to represent the scope and variety as is present with actual customer data. Customer data allows testers to better simulate application use and performance by running them against authentic customer data which in turn improves the quality of testing. For application developers, use of customer data gives them tremendous insights into the nature of data stored within the multi-tenant database system which then enables the developers to craft algorithms, functions, SQL statements and application code perfectly tailored to the needs of the customers. For upgrade procedures, customer data is useful to for trial upgrades before an official upgrade takes place to determine if faults are likely to occur once the upgrade is released into production.

Unfortunately, customer data is simply too sensitive to share with development, test and support teams, and very often, the data is protected by policy, contract, or even Federal law. It is therefore becoming increasingly common to limit the number individuals having access to customers' live production data, regardless of their role. Eliminating the ability for individuals to access customer data thus reduces the likelihood of sensitive information falling into the wrong hands due to a disgruntled employee, hacking attacks by individuals who gain access to lower-level security systems, or even simple curiosity by individuals attempting to look at information for which they have no reason or right to view.

Certain modern databases now have even implemented functionality which limits access to the data by system administrators who traditionally have enjoyed unfettered access. These prior solutions, however, make inefficient use of storage space and fail to address the needs of testing and application development.

Data masking or obfuscation works by building a dictionary of the unique values in the production data and replacing them with similar but less-sensitive information, thus resulting in nearly authentic and more production-like data. For example, the records: "Wendy, Smith, $59,000" and "Bob, Smith, $85,000" and "Wendy, McAlister, $101,000" may have a masking dictionary of: Wendy→sknskh; Bob→S9D; McAlister→Ak2#1us9d; Smith→Sm98st; $59,000→$12323; $85,000→$34567; and $101,000→$890123. In such a way, masked data is far less sensitive for support, test, and application development persons to view, while at the same time, it operates as a very good substitute for live customer data versus synthetic test data which has been conventionally utilized. Data that is not compressible may require different masking techniques such as intelligent masking to ensure the order of number data, is maintained, etc.

Unfortunately, conventional solutions that implement masking require the masking dictionaries as well as the masked data to be stored on separate servers which in turn increases the hardware costs of the solution requiring significantly increased storage costs for the duplicated data as well as increasing the operational overhead of the organization that uses data masking, often making it too expensive to be practical on a large scale for all but the most sensitive data. Having to install/manage/upgrade/troubleshoot additional systems is also very expensive.

As can be seen from the exemplary embodiment of FIG. 4, the methodologies described herein do not convert clear data to masked data for the purposes of testing. Rather, compressed data is retrieved which is less sensitive than uncompressed data in its plaintext form as it cannot be converted to plaintext without the proper data de-compression dictionary 361. Even masked or compressed data should still be protected as it can be analyzed to reveal patterns and statistics about the underlying data that should not be shared. Instead of processing the de-compression via the de-compression dictionary 361 as is used by the production query interface 310 the data is de-compressed by an already masked dictionary 465, thus negating the need to store a second copy of the data in masked form and additionally preventing exposure of the customer data in its clear form to test, development, and support personnel, while at the same time enabling the test sequencer 420 to have access to nearly authentic and "production-like" data via the uncompressed masked data 436 returned as a response 437 by the testing query interface 410.

Thus, instead of unmasking a compressed customer data value 435 having the compression key "0x123" to the clear text string "Wendy" using dictionary 361, the testing query interface 410 upon retrieving the compressed customer data value 435 with compression key "0x123" uses the identical compression key but when the pointer is processed through masked dictionary 465 the corresponding masked data value of "0x123" is returned as masked text "sknskh."

By pointing a de-compression algorithm to the masked dictionary 465 instead of the normal unmasked dictionary 361, a masked version of the actual data is accessible without making any copies of the data and on an ad-hoc or on-the-fly basis utilizing the testing query interface 410. The customer's data can be kept in its original place within databases 155 and there is no need for additional storage capacity to store the masked copy of the data.

With conventional masking solutions it is necessary to maintain a dictionary that keeps track of the masking information. Unfortunately, the masking dictionary is not overly secure because it translates directly from actual values to masked values and visa-versa, thus presenting a security risk if the dictionary is obtained.

Conversely, in accordance with certain embodiments, the masked dictionary 465 is made more secure than conventional solutions because the masked dictionary 465 includes only a list of dictionary offsets to the masked values (e.g., "0x123" maps to "sknskh") and as such, if the masked dictionary 465 itself were to be obtained, the combination of offsets and masked values could not be used to unmask the data returned by the testing query interface 410.

Compression dictionaries will ideally have a small number of values so that the keys for the dictionary (e.g., the dictionary index values) are as small as possible. For a large data set, the compression dictionary may be split into smaller scopes such that the keys for the compression dictionaries fit within a small integer value such as a 16-bit integer. The scope may be based on a block or groups of blocks to use a smaller physical chunk of data.

Some data does not compress well and may not benefit from dictionary compression for the purposes of reducing its storage footprint on disk. For example, a list of random numbers would not compress well. However, it may nevertheless be desirable to compress such data, even where a net-gain will not be realized, such that the testing query interface 410 can retrieve the corresponding compressed value for the data and then de-compress the compressed data using the masked dictionary 465 to result in masked data being returned to the test sequencer 420. Other traditional masking techniques for non-compressible data may also be employed to ensure that plaintext customer data is not revealed. For instance, data may be passed through the masking layer and processed using a masking dictionary using the compressed symbols to make the dictionary more sensitive. Masked dictionaries could also be built for non-compressible data. A customer may alternatively choose to leave non-compressible data unmasked while everything having redundancy, such as names, geographies, etc., would be masked.

Therefore, according to a first embodiment, any data that is not compressed or not compressible will nevertheless be subjected to a data compression operation and then de-compressed via data mask de-compression 460 and its masked dictionary 465 so as to obfuscate any and all data utilized by the test sequencer 420. The compression operation for non-compressible data will thus yield an offset, index, or symbol in place of the unmasked customer data, notwithstanding the fact that the offset, index, or symbol may be the same or larger in size than the original unmasked customer data. In a second distinct embodiment, conventional masking is applied to non-compressible data or non-compressible data is simply left unmasked.

According to one embodiment, a unique ID is utilized that represents scope of compression, such as a table or a chunk of data. According to one embodiment, compressed tables or chunks will share their unique scope IDs with the compression dictionary set and uncompressed tables/chunks will require additional dictionaries. In certain embodiments, the masked dictionary 465 is a set of one or more dictionaries that hold masked values for non-production use, such as testing and application development. According to one embodiment, the testing query interface 410 is enabled to read values in a masked dictionary 465 given a scope ID and compressed data string, index, offset, or other identifier within the scope ID provided.

According to certain embodiments, the testing query interface 410 is queryable as an API using SQL and JSON (JavaScript Object Notation) formats on production systems and executes its queries against the databases 155 in a live production environment having live customer data stored therein in its compressed form. The testing query interface 410 may be specified or utilized by default based on role or based on the scope of the query or data request being made against the database. For instance, a user having administrative or testing rights specifying a query scope that encompasses customer data may trigger the testing query interface 410 to be permissibly utilized without an access rights error, however, the response 437 from the testing query interface will result in uncompressed masked data being returned rather than uncompressed customer data in its clear and unmasked form.

Figure 5:
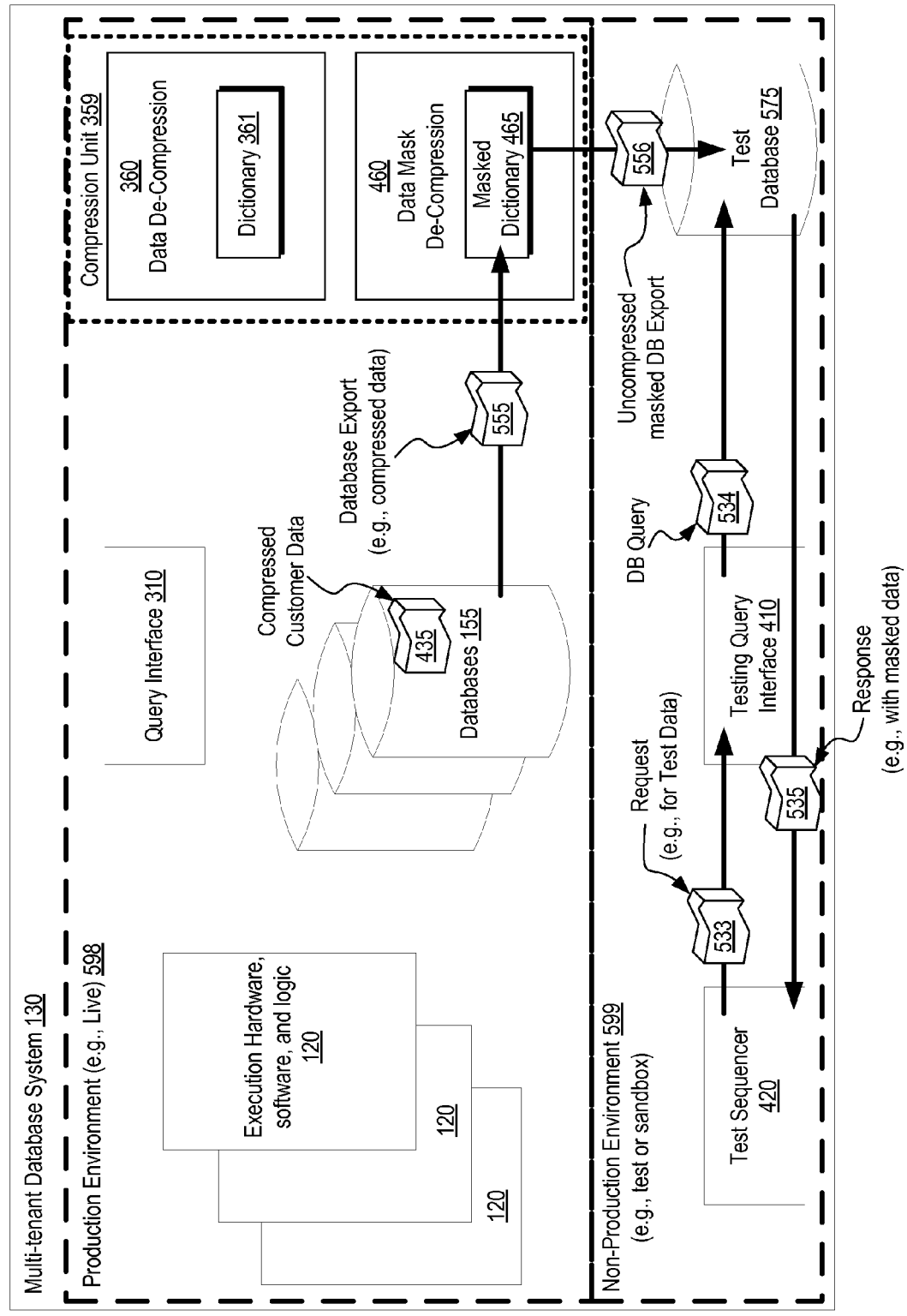
FIG. 5 depicts another exemplary architecture in accordance with described embodiments.

FIG. 5 depicts another exemplary architecture 500 in accordance with described embodiments. In particular, there is depicted the multi-tenant database system 130, its hardware, software, and logic elements 120, supporting databases 155 which store compressed customer data 435 within a live production environment 598, and compression unit 359 to perform compression and decompression as needed.

Notwithstanding that the testing query interface 410 described previously may be utilized in a live production environment 598 to return on-the-fly requests for masked customer data from the live production databases 155, it is sometimes necessary or preferable to operate test in a non-production environment 599 such as a test or sandbox type environment so as to negate any potential risk of overwhelming the infrastructure resources allocated to the live production environment 598 or causing transactions in the databases 155 of the live production environment 598 which may trigger locks, delay, additional latency for customer transactions, or any other ill effects.

Accordingly, embodiments additionally support a database export 555 in which the compressed customer data 435 in the databases 155 is transmitted to the data mask de-compression unit 460 and its masked dictionary 465, with the uncompressed masked database export 556 then being transmitted to, and stored within, test database 575. Such processing may occur separate from the execution of test sequences, for instance, where real-time synchronization of data is not important for testing purposes.

Although such a process does create a separate copy of the data in its masked form to be stored within database 155, the processing is still distinct from conventional means of data masking. Specifically, the data is masked not with a masking dictionary, but rather, is masked via the database export 555 of the compressed data which is then de-compressed through the masked dictionary 465 according to the stored compressed symbols, offset, index, or other identifier, and not based on the clear text string which is unknown and inaccessible to the test database 575 at all times.

Where the test database 575 is utilized within the non-production environment 599, the test sequencer 420 issues its request 533 for test data to the testing query interface 410 as before but the DB query 534 is issued directly to the test database 575 within the non-production environment 599 instead of being processed by the databases 155 of the live production environment 598. The response 535 is then returned to the test sequencer 420 via the testing query interface 410 or directly, providing the masked data to the test sequencer 420 for the purposes of testing or application development.

In accordance with certain embodiments, the test database 575 may additionally or optionally be shared for restrictive and tightly controlled uses. Although the data is masked it remains sensitive and should therefore not be shared without good reason and careful protections. For example, application developers may not be granted access to such data but their test procedures could be permissibly routed through the test query interface and thus exposed to masked data. Such data may be useful for not just test, but also trouble shooting, performance analysis, and so forth.

FIG. 6 is a flow diagram illustrating a method 600 for implementing data masking via compression dictionaries in accordance with disclosed embodiments. Method 600 may be performed by processing logic that may include hardware (e.g., circuitry, dedicated logic, programmable logic, microcode, etc.), software (e.g., instructions run on a processing device to perform various operations such as receiving, compressing, storing, de-compressing, retrieving, exporting, masking, communicating, updating, applying, committing, querying, executing, generating, exposing, transmitting, sending, returning, etc., in pursuance of the systems, apparatuses, and methods, as described herein. For example, the computing architecture (e.g., within production environment 111) of host organization 110 as depicted at FIG. 1, machine 800 at FIG. 8, or the system 900 at FIG. 9, may implement the described methodologies. Some of the blocks and/or operations listed below are optional in accordance with certain embodiments. The numbering of the blocks presented is for the sake of clarity and is not intended to prescribe an order of operations in which the various blocks must occur.

At block 605, processing logic receives customer data at a host organization. For instance, any entity which implements the databases and the data masking via compression dictionaries may operate as such a host organization.

At block 610, processing logic compresses the customer data using dictionary based compression and a compression dictionary.

At block 615, processing logic stores the compressed customer data in a database of the host organization.

At block 620, processing logic retrieves the compressed customer data from the database of the host organization.

At block 625, processing logic de-compress the compressed customer data via a masked compression dictionary, in which the masked compression dictionary de-compresses the customer data into masked customer data.

According to another embodiment of method 600, receiving customer data at the host organization includes receiving the customer data in its plain text and uncompressed form as part of a database transaction in a live production environment of the host organization; and in which retrieving the compressed customer data from the database of the host organization includes retrieving the compressed customer data from the database responsive to a masked transaction (e.g., such as a transaction by a test sequencer which is subjected to masked data rather than production data in its plaintext and uncompressed form) in which the masked transaction specifies a database query for the customer data, and further in which the host organization returns the masked customer data to fulfill the masked transaction without exposing the customer data in its plain text and uncompressed form.

According to another embodiment of method 600, the compression dictionary used to compress the customer data maps strings to symbols; in which storing the compressed customer data in the database of the host organization includes storing the symbols and not the strings; and in which masked compression dictionary maps the symbols to masked strings different than the strings used by the compression dictionary to create the symbols.

According to another embodiment of method 600, the symbols are one of a compression key, an offset, an index, or a replacement string having a size in bits less than the string being compressed.

According to another embodiment of method 600, compressing the customer data using dictionary based compression and a compression dictionary includes generating a compression key for the customer data using the compression dictionary and storing the compression key in the database; and in which de-compressing the compressed customer data via the masked compression dictionary comprises retrieving the compression key for the customer data and using the compression key to lookup the masked customer data in the masked compression dictionary.

According to another embodiment of method 600, retrieving the compressed customer data from the database of the host organization includes receiving a first database query from a testing interface and returning the masked customer data responsive to the first database query from the testing query interface; and in which the method further includes: (a) receiving a second database query from a query interface, (b) retrieving the compressed customer data from the database of the host organization, (c) de-compressing the compressed customer data via the compression dictionary; and (d) returning the customer data in its plain text and uncompressed form responsive to the second database query from the query interface. For example, the first database query is for the sake of internal testing, and as such, must be given masked data, where as the second database query is from a customer or a user with proper access rights to see the data being requested, and as such, the data should be recovered and returned in its original form, that is to say, returned in its plain text and uncompressed form.

Thus, according to another embodiment of method 600, the first database query is issued as part of a masked transaction against the database of the host organization; and in which the second database query is issued on behalf of a customer having ownership of the customer data.

According to another embodiment, method 600 further includes: receiving a test database query from a test Application Programming Interface (test API), the test database query specifying the customer data to be retrieved from the database of the host organization; and in which the test API causes the compressed customer data retrieved from the database to be de-compressed using the masked compression dictionary and return the masked customer data responsive to the test database query.

According to another embodiment, method 600 further includes: processing real-time transaction requests at the host organization within a live production environment via a customer facing query interface concurrently with the one or more masked transactions within the live production environment via an internally facing testing query interface; in which the real-time transaction requests via the customer facing query interface return the customer data in its plain text and uncompressed form based on the compression dictionary; and in which the one or more masked transactions via the internally facing testing query interface return masked customer data in an uncompressed form based on the masked compression dictionary;

According to another embodiment of method 600, the database of the host organization stores underlying records on behalf of customer organizations, the underlying records having sensitive data stored therein; and in which the underlying records of the databases having sensitive data stored therein include at least one of HIPAA (Health Insurance Portability and Accountability Act) protected data; Sarbanes Oxley Act (SOX) protected data; proprietary sales data; proprietary financial data; proprietary trade-secret data; and government classified data.

According to another embodiment, method 600 further includes: exporting the compressed customer data stored in the database to a test database via the operations including: (a) de-compressing the compressed customer data using the masked compression dictionary, and (b) storing the masked customer data in the test database in an uncompressed form; and in which the test database resides in a non-production environment separate from the database within a live production environment.

According to another embodiment, method 600 further includes: sharing the masked customer data as stored in the test database in an uncompressed form subject to policy restrictions and controls.

According to another embodiment of method 600, the host organization implements the method via computing architecture of the host organization including at least the processor and the memory; in which a user interface operates at a user client device remote from the host organization and communicatively interfaces with the host organization via a public Internet; and in which the host organization operates as a cloud based service provider to the user client device.

According to another embodiment of method 600, the host organization provides a multi-tenant database system via the database and the computing architecture of the host organization, the multi-tenant database system having elements of hardware and software that are shared by a plurality of separate and distinct customer organizations, each of the separate and distinct customer organizations being remotely located from the host organization.

According to another embodiment, method 600 further includes: retrieving non-compressible data from the database of the host organization; masking the non-compressible data via the masked compression dictionary; and returning the de-compressed masked customer data and the masked non-compressible data responsive to a masked transaction issued on behalf of a test sequencer.

According to a particular embodiment, there is non-transitory computer readable storage media having instructions stored thereon that, when executed by a processor in a host organization, the instructions cause the host organization to perform operations including: receiving customer data at the host organization; compressing the customer data using dictionary based compression and a compression dictionary; storing the compressed customer data in a database of the host organization; retrieving the compressed customer data from the database of the host organization; and de-compressing the compressed customer data via a masked compression dictionary, in which the masked compression dictionary de-compresses the customer data into masked customer data.

Figure 7A:
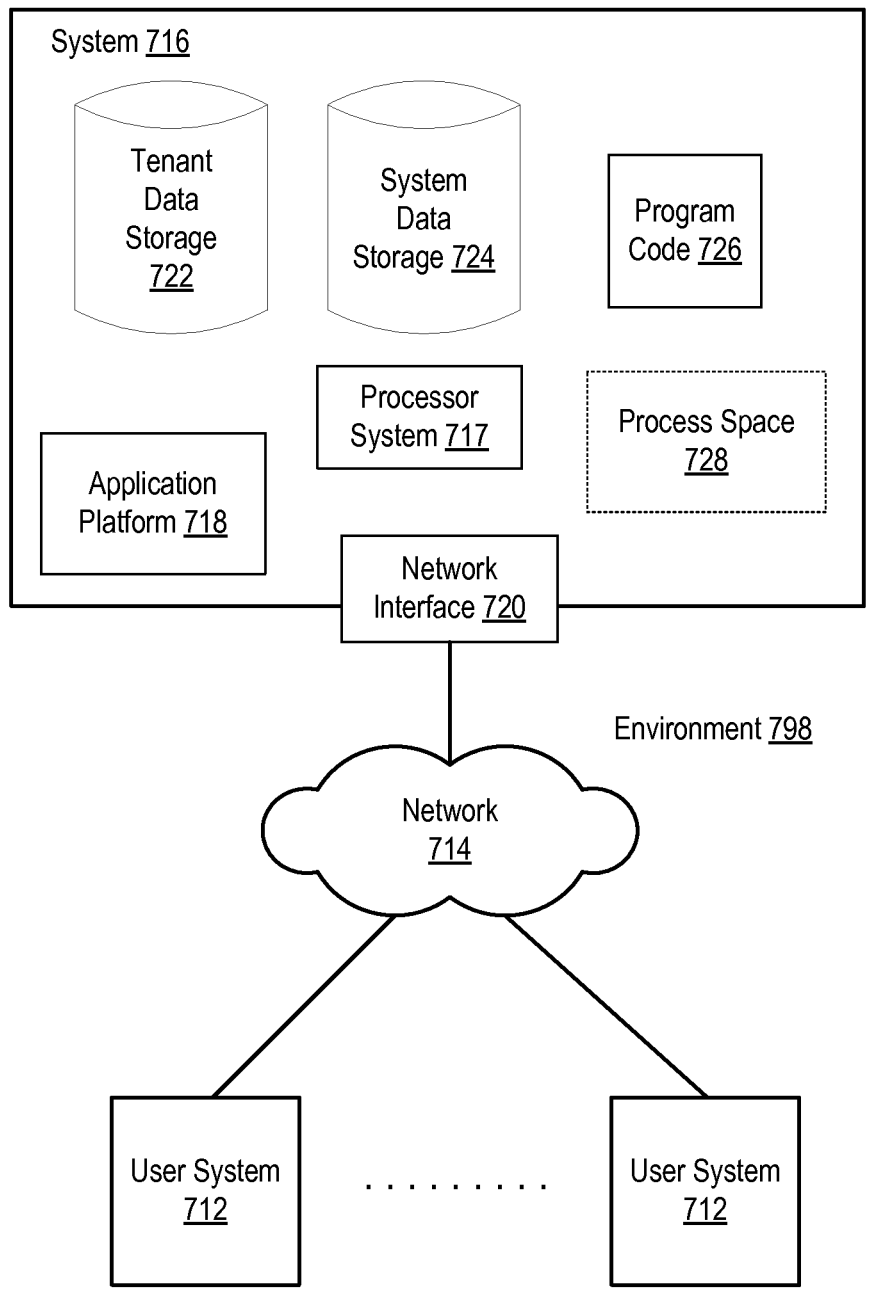
FIG. 7A illustrates a block diagram of an environment in which an on-demand database service may operate in accordance with the described embodiments.

FIG. 7A illustrates a block diagram of an environment 798 in which an on-demand database service may operate in accordance with the described embodiments. Environment 798 may include user systems 712, network 714, system 716, processor system 717, application platform 718, network interface 720, tenant data storage 722, system data storage 724, program code 726, and process space 728. In other embodiments, environment 798 may not have all of the components listed and/or may have other elements instead of, or in addition to, those listed above.

Environment 798 is an environment in which an on-demand database service exists. User system 712 may be any machine or system that is used by a user to access a database user system. For example, any of user systems 712 can be a handheld computing device, a mobile phone, a laptop computer, a work station, and/or a network of computing devices. As illustrated in FIG. 7A (and in more detail in FIG. 7B) user systems 712 might interact via a network 714 with an on-demand database service, which is system 716.

An on-demand database service, such as system 716, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 716" and "system 716" is used interchangeably herein. A database image may include one or more database objects. A relational database management system (RDMS) or the equivalent may execute storage and retrieval of information against the database object(s). Application platform 718 may be a framework that allows the applications of system 716 to run, such as the hardware and/or software, e.g., the operating system. In an embodiment, on-demand database service 716 may include an application platform 718 that enables creation, managing and executing one or more applications developed by the provider of the on-demand database service, users accessing the on-demand database service via user systems 712, or third party application developers accessing the on-demand database service via user systems 712.

The users of user systems 712 may differ in their respective capacities, and the capacity of a particular user system 712 might be entirely determined by permissions (permission levels) for the current user. For example, where a salesperson is using a particular user system 712 to interact with system 716, that user system has the capacities allotted to that salesperson. However, while an administrator is using that user system to interact with system 716, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 714 is any network or combination of networks of devices that communicate with one another. For example, network 714 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it is understood that the networks that the claimed embodiments may utilize are not so limited, although TCP/IP is a frequently implemented protocol.

User systems 712 might communicate with system 716 using TCP/IP and, at a higher network level, use other common Internet protocols to communicate, such as HTTP, FTP, AFS, WAP, etc. In an example where HTTP is used, user system 712 might include an HTTP client commonly referred to as a "browser" for sending and receiving HTTP messages to and from an HTTP server at system 716. Such an HTTP server might be implemented as the sole network interface between system 716 and network 714, but other techniques might be used as well or instead. In some implementations, the interface between system 716 and network 714 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 716, shown in FIG. 7A, implements a web-based customer relationship management (CRM) system. For example, in one embodiment, system 716 includes application servers configured to implement and execute CRM software applications as well as provide related data, code, forms, webpages and other information to and from user systems 712 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 716 implements applications other than, or in addition to, a CRM application. For example, system 716 may provide tenant access to multiple hosted (standard and custom) applications, including a CRM application. User (or third party developer) applications, which may or may not include CRM, may be supported by the application platform 718, which manages creation, storage of the applications into one or more database objects and executing of the applications in a virtual machine in the process space of the system 716.

One arrangement for elements of system 716 is shown in FIG. 7A, including a network interface 720, application platform 718, tenant data storage 722 for tenant data 723, system data storage 724 for system data 725 accessible to system 716 and possibly multiple tenants, program code 726 for implementing various functions of system 716, and a process space 728 for executing MTS system processes and tenant-specific processes, such as running applications as part of an application hosting service. Additional processes that may execute on system 716 include database indexing processes.

Several elements in the system shown in FIG. 7A include conventional, well-known elements that are explained only briefly here. For example, each user system 712 may include a desktop personal computer, workstation, laptop, PDA, cell phone, or any wireless access protocol (WAP) enabled device or any other computing device capable of interfacing directly or indirectly to the Internet or other network connection. User system 712 typically runs an HTTP client, e.g., a browsing program, such as Microsoft's Internet Explorer browser, a Mozilla or Firefox browser, an Opera, or a WAP-enabled browser in the case of a smartphone, tablet, PDA or other wireless device, or the like, allowing a user (e.g., subscriber of the multi-tenant database system) of user system 712 to access, process and view information, pages and applications available to it from system 716 over network 714. Each user system 712 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 716 or other systems or servers. For example, the user interface device can be used to access data and applications hosted by system 716, and to perform searches on stored data, and otherwise allow a user to interact with various GUI pages that may be presented to a user. As discussed above, embodiments are suitable for use with the Internet, which refers to a specific global internetwork of networks. However, it is understood that other networks can be used instead of the Internet, such as an intranet, an extranet, a virtual private network (VPN), a non-TCP/IP based network, any LAN or WAN or the like.

According to one embodiment, each user system 712 and all of its components are operator configurable using applications, such as a browser, including computer code run using a central processing unit such as an Intel Pentium® processor or the like. Similarly, system 716 (and additional instances of an MTS, where more than one is present) and all of their components might be operator configurable using application(s) including computer code to run using a central processing unit such as processor system 717, which may include an Intel Pentium® processor or the like, and/or multiple processor units.

According to one embodiment, each system 716 is configured to provide webpages, forms, applications, data and media content to user (client) systems 712 to support the access by user systems 712 as tenants of system 716. As such, system 716 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS may include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It is understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 7B:
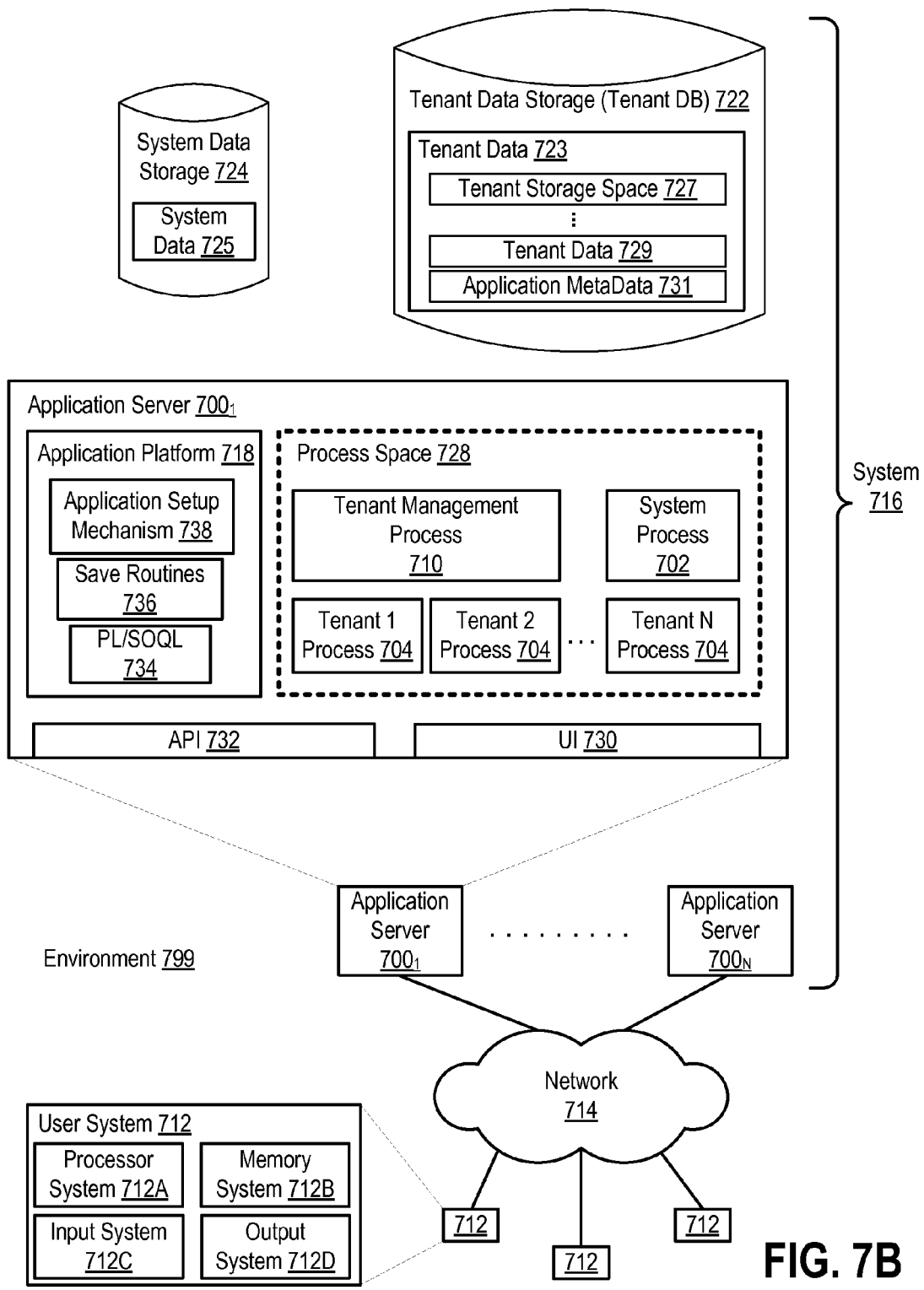
FIG. 7B illustrates another block diagram of an embodiment of elements of FIG. 7A and various possible interconnections between such elements in accordance with the described embodiments.

FIG. 7B illustrates another block diagram of an embodiment of elements of FIG. 7A and various possible interconnections between such elements in accordance with the described embodiments. FIG. 7B also illustrates environment 799. However, in FIG. 7B, the elements of system 716 and various interconnections in an embodiment are illustrated in further detail. More particularly, FIG. 7B shows that user system 712 may include a processor system 712A, memory system 712B, input system 712C, and output system 712D. FIG. 7B shows network 714 and system 716. FIG. 7B also shows that system 716 may include tenant data storage 722, having therein tenant data 723, which includes, for example, tenant storage space 727, tenant data 729, and application metadata 731. System data storage 724 is depicted as having therein system data 725. Further depicted within the expanded detail of application servers $700_{1-N}$ are User Interface (UI) 730, Application Program Interface (API) 732, application platform 718 includes PL/SOQL 734, save routines 736, application setup mechanism 738, process space 728 includes system process space 702, tenant 1-N process spaces 704, and tenant management process space 710. In other embodiments, environment 799 may not have the same elements as those listed above and/or may have other elements instead of, or in addition to, those listed above.

User system 712, network 714, system 716, tenant data storage 722, and system data storage 724 were discussed above in FIG. 7A. As shown by FIG. 7B, system 716 may include a network interface 720 (of FIG. 7A) implemented as a set of HTTP application servers 700, an application platform 718, tenant data storage 722, and system data storage 724. Also shown is system process space 702, including individual tenant process spaces 704 and a tenant management process space 710. Each application server 700 may be configured to tenant data storage 722 and the tenant data 723 therein, and system data storage 724 and the system data 725 therein to serve requests of user systems 712. The tenant data 723 might be divided into individual tenant storage areas (e.g., tenant storage space 727), which can be either a physical arrangement and/or a logical arrangement of data. Within each tenant storage space 727, tenant data 729, and application metadata 731 might be similarly allocated for each user. For example, a copy of a user's most recently used (MRU) items might be stored to tenant data 729. Similarly, a copy of MRU items for an entire organization that is a tenant might be stored to tenant storage space 727. A UI 730 provides a user interface and an API 732 provides an application programmer interface into system 716 resident processes to users and/or developers at user systems 712. The tenant data and the system data may be stored in various databases, such as one or more Oracle™ databases.

Application platform 718 includes an application setup mechanism 738 that supports application developers' creation and management of applications, which may be saved as metadata into tenant data storage 722 by save routines 736 for execution by subscribers as one or more tenant process spaces 704 managed by tenant management process space 710 for example. Invocations to such applications may be coded using PL/SOQL 734 that provides a programming language style interface extension to API 732. Invocations to applications may be detected by one or more system processes, which manages retrieving application metadata 731 for the subscriber making the invocation and executing the metadata as an application in a virtual machine.

Each application server 700 may be communicably coupled to database systems, e.g., having access to system data 725 and tenant data 723, via a different network connection. For example, one application server $700_1$ might be coupled via the network 714 (e.g., the Internet), another application server $700_{N-1}$ might be coupled via a direct network link, and another application server $700_N$ might be coupled by yet a different network connection. Transfer Control Protocol and Internet Protocol (TCP/IP) are typical protocols for communicating between application servers 700 and the database system. However, it will be apparent to one skilled in the art that other transport protocols may be used to optimize the system depending on the network interconnect used.

In certain embodiments, each application server 700 is configured to handle requests for any user associated with any organization that is a tenant. Because it is desirable to be able to add and remove application servers from the server pool at any time for any reason, there is preferably no server affinity for a user and/or organization to a specific application server 700. In one embodiment, therefore, an interface system implementing a load balancing function (e.g., an F5 Big-IP load balancer) is communicably coupled between the application servers 700 and the user systems 712 to distribute requests to the application servers 700. In one embodiment, the load balancer uses a least connections algorithm to route user requests to the application servers 700. Other examples of load balancing algorithms, such as round robin and observed response time, also can be used. For example, in certain embodiments, three consecutive requests from the same user may hit three different application servers 700, and three requests from different users may hit the same application server 700. In this manner, system 716 is multi-tenant, in which system 716 handles storage of, and access to, different objects, data and applications across disparate users and organizations.

As an example of storage, one tenant might be a company that employs a sales force where each salesperson uses system 716 to manage their sales process. Thus, a user might maintain contact data, leads data, customer follow-up data, performance data, goals and progress data, etc., all applicable to that user's personal sales process (e.g., in tenant data storage 722). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 716 that are allocated at the tenant level while other data structures might be managed at the user level. Because an MTS might support multiple tenants including possible competitors, the MTS may have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 716 might also maintain system level data usable by multiple tenants or other data. Such system level data might include industry reports, news, postings, and the like that are sharable among tenants.

In certain embodiments, user systems 712 (which may be client systems) communicate with application servers 700 to request and update system-level and tenant-level data from system 716 that may require sending one or more queries to tenant data storage 722 and/or system data storage 724. System 716 (e.g., an application server 700 in system 716) automatically generates one or more SQL statements (e.g., one or more SQL queries) that are designed to access the desired information. System data storage 724 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects as described herein. It is understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It is understood that the word "entity" may also be used interchangeably herein with "object" and "table."

In some multi-tenant database systems, tenants may be allowed to create and store custom objects, or they may be allowed to customize standard entities or objects, for example by creating custom fields for standard objects, including custom index fields. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

FIG. 8 illustrates a diagrammatic representation of a machine 800 in the exemplary form of a computer system, in accordance with one embodiment, within which a set of instructions, for causing the machine/computer system 800 to perform any one or more of the methodologies discussed herein, may be executed. In alternative embodiments, the machine may be connected (e.g., networked) to other machines in a Local Area Network (LAN), an intranet, an extranet, or the public Internet. The machine may operate in the capacity of a server or a client machine in a client-server network environment, as a peer machine in a peer-to-peer (or distributed) network environment, as a server or series of servers within an on-demand service environment. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 800 includes a processor 802, a main memory 804 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 818 (e.g., a persistent storage device including hard disk drives and a persistent database and/or a multi-tenant database implementation), which communicate with each other via a bus 830. Main memory 804 includes a data compressor 824 which may implement dictionary based data compression with a data dictionary to compress customer data to be stored. Data de-compressor 823 de-compresses compressed data via a data dictionary to result in customer data in its plaintext and uncompressed form or operates using a masked data dictionary to result in masked customer data in its uncompressed form. Test query interface 825 is capable to receive database queries for purposes of testing and permissibly returns masked customer data in place of customer data in its plaintext and uncompressed form. Main memory 804 and its sub-elements are operable in conjunction with processing logic 826 and processor 802 to perform the methodologies discussed herein. The computer system 800 may additionally or alternatively embody the server side elements as described above.

Processor 802 represents one or more general-purpose processing devices such as a microprocessor, central processing unit, or the like. More particularly, the processor 802 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 802 may also be one or more special-purpose processing devices such as an application specific integrated circuit (ASIC), a field programmable gate array (FPGA), a digital signal processor (DSP), network processor, or the like. Processor 802 is configured to execute the processing logic 826 for performing the operations and functionality which is discussed herein.

The computer system 800 may further include a network interface card 808. The computer system 800 also may include a user interface 810 (such as a video display unit, a liquid crystal display (LCD), or a cathode ray tube (CRT)), an alphanumeric input device 812 (e.g., a keyboard), a cursor control device 814 (e.g., a mouse), and a signal generation device 816 (e.g., an integrated speaker). The computer system 800 may further include peripheral device 836 (e.g., wireless or wired communication devices, memory devices, storage devices, audio processing devices, video processing devices, etc.).

The secondary memory 818 may include a non-transitory machine-readable storage medium or a non-transitory computer readable storage medium 831 on which is stored one or more sets of instructions (e.g., software 822) embodying any one or more of the methodologies or functions described herein. The software 822 may also reside, completely or at least partially, within the main memory 804 and/or within the processor 802 during execution thereof by the computer system 800, the main memory 804 and the processor 802 also constituting machine-readable storage media. The software 822 may further be transmitted or received over a network 820 via the network interface card 808.

Figure 9:
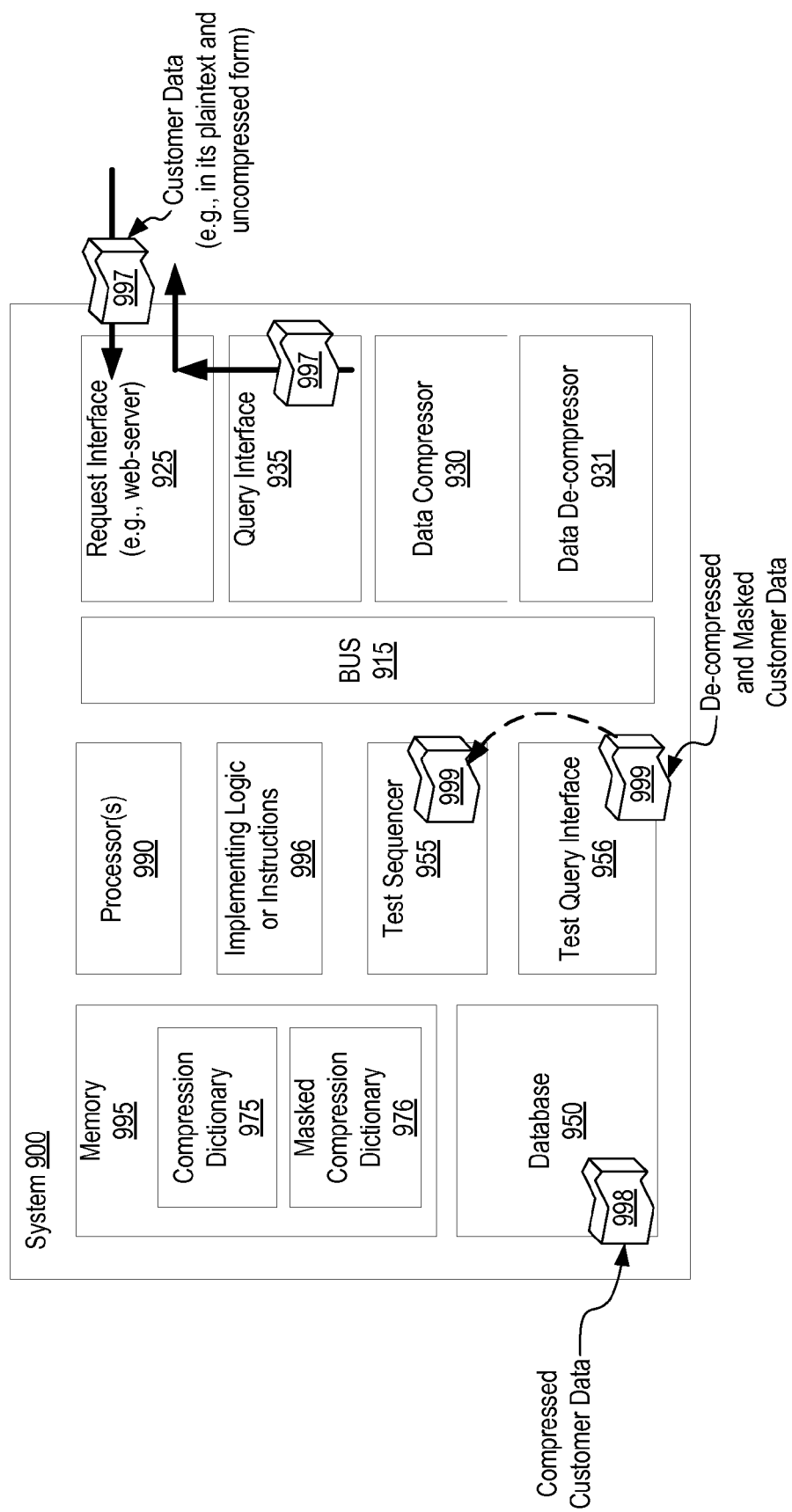
FIG. 9 shows a diagrammatic representation of a system in accordance with which embodiments may operate, be installed, integrated, or configured.

FIG. 9 shows a diagrammatic representation of a system 900 in which embodiments may operate, be installed, integrated, or configured.

In accordance with one embodiment, there is a system 900 having at least a processor 990 and a memory 995 therein to execute implementing logic and/or instructions 996. According to such an embodiment, the system 900 further includes a request interface 925 to receive customer data 997 at the system 900; a data compressor 930 to compress the customer data 997 using dictionary based compression and a compression dictionary 975; a database 950 to store the compressed customer data 998; a test query interface 956 to retrieve the compressed customer data 998 from the database 950; and a data de-compressor 931 to de-compress the compressed customer data 998 via a masked compression dictionary 976, in which the masked compression dictionary 976 de-compresses the customer data into masked customer data 999.

According to another embodiment of the system 900, the test query interface 956 is to receive a first database query from a test sequencer 955 and return the masked customer data 999 to the test sequencer 955 responsive to the first database query from the testing query interface 956; and in which the system 900 further includes: (a) the request interface 925 to further receive a second database query, (b) a query interface 935 to retrieve the compressed customer data 998 from the database, (c) the data de-compressor 931 to de-compress the compressed customer data 998 via the compression dictionary 975; and (d) the request interface 925 to return the customer data 997 in its plain text and uncompressed form responsive to the second database query According to another embodiment, the system 900, further includes: a web-server to implement the request interface 925 and to receive the customer data 997 at the system 900 from one of a plurality of customer organizations remote from the system 900; in which the plurality of customer organizations communicably interface with the system 900 via a public Internet; and in which each customer organization is an entity selected from the group consisting of: a separate and distinct remote organization, an organizational group within the host organization, a business partner of the host organization, or a customer organization that subscribes to cloud computing services provided by the host organization.

According to another embodiment of the system 900, a user interface operates at a user client device remote from the system and communicatively interfaces with the system via a public Internet; in which the system operates at a host organization as a cloud based service provider to the user client device; and in which the cloud based service provider hosts the customer data 997 within a multi-tenant database system at a host organization on behalf of the user.

Bus 915 interfaces the various components of the system 900 amongst each other, with any other peripheral(s) of the system 900, and with external components such as external network elements, other machines, client devices, etc., including communicating with such external devices via a network interface over a LAN, WAN, or the public Internet.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as are apparent to those skilled in the art. Therefore, the scope of the appended claims are to be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:
1. A method in a host organization having a processor and a memory therein, wherein the method comprises:
  receiving customer data at the host organization via the processor and memory, wherein receiving customer data at the host organization comprises receiving the customer data in its plain text and uncompressed form as part of a database transaction in a live production environment of the host organization;
  compressing the customer data using dictionary based compression and a compression dictionary, wherein the compression dictionary used to compress the customer data maps strings to symbols;
  storing the compressed customer data in a database of the host organization, wherein storing the compressed customer data in the database of the host organization comprises storing the symbols and not the strings;
  retrieving the compressed customer data from the database of the host organization, wherein retrieving the compressed customer data from the database of the host organization comprises retrieving the compressed customer data from the database responsive to a masked transaction specifying a database query for the customer data, wherein the host organization returns the masked customer data to fulfill the masked transaction without exposing the customer data in its plain text and uncompressed form; and
  de-compressing the compressed customer data via a masked compression dictionary, wherein the masked compression dictionary de-compresses the customer data into masked customer data by mapping the sym- bols to masked strings different than the strings used by the compression dictionary to create the symbols.

2. The method of claim 1, wherein the symbols are one of a compression key, an offset, an index, or a replacement string having a size in bits less than the string being compressed.

3. The method of claim 1:
wherein compressing the customer data using dictionary based compression and a compression dictionary comprises generating a compression key for the customer data using the compression dictionary and storing the compression key in the database; and
wherein de-compressing the compressed customer data via the masked compression dictionary comprises retrieving the compression key for the customer data and using the compression key to lookup the masked customer data in the masked compression dictionary.

4. The method of claim 1:
wherein retrieving the compressed customer data from the database of the host organization comprises receiving a first database query from a testing interface and returning the masked customer data responsive to the first database query from the testing query interface; and
wherein the method further comprises:
(a) receiving a second database query from a query interface,
(b) retrieving the compressed customer data from the database of the host organization,
(c) de-compressing the compressed customer data via the compression dictionary; and
(d) returning the customer data in its plain text and uncompressed form responsive to the second database query from the query interface.

5. The method of claim 4:
wherein the first database query is issued as part of a masked transaction against the database of the host organization; and
wherein the second database query is issued on behalf of a customer having ownership of the customer data.

6. The method of claim 1, further comprising:
receiving a test database query from a test Application Programming Interface (test API), the test database query specifying the customer data to be retrieved from the database of the host organization; and
wherein the test API causes the compressed customer data retrieved from the database to be de-compressed using the masked compression dictionary and return the masked customer data responsive to the test database query.

7. The method of claim 1, further comprising:
processing real-time transaction requests at the host organization within a live production environment via a customer facing query interface concurrently with the one or more masked transactions within the live production environment via an internally facing testing query interface;
wherein the real-time transaction requests via the customer facing query interface return the customer data in its plain text and uncompressed form based on the compression dictionary; and
wherein the one or more masked transactions via the internally facing testing query interface return masked customer data in an uncompressed form based on the masked compression dictionary.

8. The method of claim 1:
wherein the database of the host organization stores underlying records on behalf of customer organizations, the underlying records having sensitive data stored therein; and
wherein the underlying records of the databases having sensitive data stored therein include at least one of HIPAA (Health Insurance Portability and Accountability Act) protected data; Sarbanes-Oxley Act (SOX) protected data; proprietary sales data; proprietary financial data; proprietary trade-secret data; and government classified data.

9. The method of claim 1, further comprising:
exporting the compressed customer data stored in the database to a test database via the operations including: (a) de-compressing the compressed customer data using the masked compression dictionary, and (b) storing the masked customer data in the test database in an uncompressed form; and
wherein the test database resides in a non-production environment separate from the database within a live production environment.

10. The method of claim 9, further comprising:
sharing the masked customer data as stored in the test database in an uncompressed form subject to policy restrictions and controls.

11. The method of claim 10, wherein the host organization provides a multi-tenant database system via the database and the computing architecture of the host organization, the multi-tenant database system having elements of hardware and software that are shared by a plurality of separate and distinct customer organizations, each of the separate and distinct customer organizations being remotely located from the host organization.

12. The method of claim 1:
wherein the host organization implements the method via computing architecture of the host organization including at least the processor and the memory;
wherein a user interface operates at a user client device remote from the host organization and communicatively interfaces with the host organization via a public Internet; and
wherein the host organization operates as a cloud based service provider to the user client device.

13. The method of claim 1, further comprising:
retrieving non-compressible data from the database of the host organization;
masking the non-compressible data via the masked compression dictionary; and
returning the de-compressed masked customer data and the masked non-compressible data responsive to a masked transaction issued on behalf of a test sequencer.

14. Non-transitory computer readable storage media having instructions stored thereon that, when executed by a processor in a host organization, the instructions cause the host organization to perform operations comprising:
receiving customer data at the host organization via the processor, wherein receiving customer data at the host organization comprises receiving the customer data in its plain text and uncompressed form as part of a database transaction in a live production environment of the host organization;
compressing the customer data using dictionary based compression and a compression dictionary, wherein the compression dictionary used to compress the customer data maps strings to symbols;

storing the compressed customer data in a database of the host organization, wherein storing the compressed customer data in the database of the host organization comprises storing the symbols and not the strings;

retrieving the compressed customer data from the database of the host organization, wherein retrieving the compressed customer data from the database of the host organization comprises retrieving the compressed customer data from the database responsive to a masked transaction specifying a database query for the customer data, wherein the host organization returns the masked customer data to fulfill the masked transaction without exposing the customer data in its plain text and uncompressed form; and de-compressing the compressed customer data via a masked compression dictionary, wherein the masked compression dictionary de-compresses the customer data into masked customer data by mapping the symbols to masked strings different than the strings used by the compression dictionary to create the symbols.

15. The non-transitory computer readable storage media of claim 14:

wherein receiving customer data at the host organization comprises receiving the customer data in its plain text and uncompressed form as part of a database transaction in a live production environment of the host organization; and wherein retrieving the compressed customer data from the database of the host organization comprises retrieving the compressed customer data from the database responsive to a masked transaction specifying a database query for the customer data, wherein the host organization returns the masked customer data to fulfill the masked transaction without exposing the customer data in its plain text and uncompressed form.

16. The non-transitory computer readable storage media of claim 14:

wherein the symbols are one of a compression key, an offset, an index, or a replacement string having a size in bits less than the string being compressed.

17. The non-transitory computer readable storage media of claim 14:

wherein the database of the host organization stores underlying records on behalf of customer organizations, the underlying records having sensitive data stored therein; and wherein the underlying records of the databases having sensitive data stored therein include at least one of HIPAA (Health Insurance Portability and Accountability Act) protected data; Sarbanes-Oxley Act (SOX) protected data; proprietary sales data; proprietary financial data; proprietary trade-secret data; and government classified data.

18. A system comprising:

a processor and a memory to execute instructions at the system;

a request interface to receive customer data at the system, wherein the request interface is to receive the customer data in its plain text and uncompressed form as part of a database transaction in a live production environment of the host organization;

a data compressor to compress the customer data using dictionary based compression and a compression dictionary, wherein the compression dictionary used to compress the customer data maps strings to symbols;

a database to store the compressed customer data, wherein the database is to store the symbols and not the strings;

a test query interface to retrieve the compressed customer data from the database, wherein the test query interface is to retrieve the compressed customer data from the database responsive to a masked transaction specifying a database query for the customer data, wherein the test query interface is to return the masked customer data to fulfill the masked transaction without exposing the customer data in its plain text and uncompressed form; and a data de-compressor to de-compress the compressed customer data via a masked compression dictionary, wherein the masked compression dictionary de-compresses the customer data into masked customer data by mapping the symbols to masked strings different than the strings used by the compression dictionary to create the symbols.

19. The system of claim 18:

wherein the test query interface to retrieve the compressed customer data from the database comprises the test query interface to receive a first database query from a testing sequencer and return the masked customer data to the test sequencer responsive to the first database query from the testing query interface; and wherein the system further comprises:

(a) the request interface to further receive a second database query, (b) a query interface to retrieve the compressed customer data from the database, (c) the data de-compressor to de-compress the compressed customer data via the compression dictionary; and (d) the request interface to return the customer data in its plain text and uncompressed form responsive to the second database query.

20. The system of claim 18, further comprising:

a web-server to implement the request interface and to receive the customer data at the system from one of a plurality of customer organizations remote from the system;

wherein the plurality of customer organizations communicably interface with the system via a public Internet; and wherein each customer organization is an entity selected from the group consisting of: a separate and distinct remote organization, an organizational group within the host organization, a business partner of the host organization, or a customer organization that subscribes to cloud computing services provided by the host organization.

21. The system of claim 18:

wherein a user interface operates at a user client device remote from the system and communicatively interfaces with the system via a public Internet;

wherein the system operates at a host organization as a cloud based service provider to the user client device; and wherein the cloud based service provider hosts the customer data within a multi-tenant database system at a host organization on behalf of the user.

* * * * *